(12) United States Patent
Field et al.

(10) Patent No.: US 8,292,781 B2
(45) Date of Patent: Oct. 23, 2012

(54) POWERTRAIN CONTROL METHOD AND SYSTEM

(75) Inventors: Matthew Gibson Field, Longridge (GB); Matthew Piers Burke, Kilsby (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1046 days.

(21) Appl. No.: 11/722,694

(22) PCT Filed: Jan. 30, 2006

(86) PCT No.: PCT/EP2006/050536
§ 371 (c)(1),
(2), (4) Date: Mar. 25, 2008

(87) PCT Pub. No.: WO2006/079662
PCT Pub. Date: Aug. 3, 2006

(65) Prior Publication Data
US 2009/0062065 A1    Mar. 5, 2009

(30) Foreign Application Priority Data

Jan. 28, 2005  (GB) .................................. 0501763.7

(51) Int. Cl.
*B60W 10/06* (2006.01)
*B60W 10/107* (2012.01)

(52) U.S. Cl. .......................................... 477/37; 477/111

(58) Field of Classification Search ..................... 477/37, 477/42, 43, 111, 113
See application file for complete search history.

(56) References Cited

U.S. PATENT DOCUMENTS

| 4,464,952 A | 8/1984 | Stubbs |
| 4,750,381 A | 6/1988 | Kita et al. |
| 5,047,937 A | 9/1991 | Vahabzadeh et al. |

(Continued)

FOREIGN PATENT DOCUMENTS

DE    27 20 950 A 1    11/1978

(Continued)

OTHER PUBLICATIONS

PCT/EP2006/050536, International Preliminary Report on Patentability, Date of Issuance Jul. 31, 2007, 7 pages.

(Continued)

*Primary Examiner* — Edwin A Young
(74) *Attorney, Agent, or Firm* — Blakely, Sokoloff, Taylor & Zafman LLP (57) ABSTRACT

The invention concerns a method of operating a motor vehicle powertrain comprising an infinitely variable transmission and an engine. The transmission comprises a rotary transmission input coupled to the engine, a rotary transmission output coupled to the vehicle wheels, a variator which provides a continuously variable ratio (the "variator ratio"), and gearing for coupling the variator between the engine and the transmission output in such a manner that the ratio of transmission output speed to transmission input speed (the "reciprocal transmission ratio") is a function of the variator ratio. The available range of variator ratios maps onto both forward and reverse reciprocal transmission ratios, and at a particular variator ratio (the "geared neutral ratio") the transmission output is stationary despite its being coupled through the transmission to the rotating transmission input. The comprises sustaining engine speed in a range of low reciprocal transmission ratios containing and extending to either side of geared neutral, by applying a drive torque demand to the engine even while the powertrain is operating in overrun.

22 Claims, 7 Drawing Sheets

U.S. PATENT DOCUMENTS

| | | |
|---|---|---|
| 5,139,466 A | 8/1992 | Perry |
| 5,521,819 A | 5/1996 | Greenwood |
| 5,564,998 A | 10/1996 | Fellows |
| 5,669,846 A | 9/1997 | Moroto et al. |
| 5,766,105 A | 6/1998 | Fellows et al. |
| 6,457,382 B2 | 10/2002 | Cronin et al. |
| 6,634,977 B2 | 10/2003 | Ooyama |
| 6,663,532 B1 | 12/2003 | McIndoe et al. |
| 6,909,953 B2 | 6/2005 | Joe et al. |
| 7,160,226 B2 | 1/2007 | Fuller |
| 7,354,368 B2 | 4/2008 | Pollman |
| 7,371,204 B2 | 5/2008 | Reuschel et al. |
| 7,407,459 B2 | 8/2008 | Greenwood et al. |
| 7,625,309 B2 | 12/2009 | Fuller |
| 2001/0029218 A1 | 10/2001 | Cronin et al. |
| 2002/0086764 A1 | 7/2002 | Ooyama |
| 2002/0094904 A1 | 7/2002 | Kuramoto et al. |
| 2005/0043138 A1* | 2/2005 | Fuller .................. 477/37 |
| 2005/0080536 A1* | 4/2005 | Yamaguchi et al. ........... 701/51 |
| 2006/0142110 A1* | 6/2006 | Greenwood et al. ......... 475/214 |
| 2006/0154779 A1* | 7/2006 | Schlecht ................... 477/37 |
| 2006/0201766 A1* | 9/2006 | Fuller .................. 192/3.51 |

FOREIGN PATENT DOCUMENTS

| | | |
|---|---|---|
| EP | 0 043 184 A1 | 1/1982 |
| EP | 0 177 240 A2 | 4/1986 |
| EP | 0 185 463 B1 | 6/1986 |
| EP | 0 444 086 A2 | 9/1991 |
| EP | 0 643 648 A1 | 3/1995 |
| EP | 0 679 235 A1 | 11/1995 |
| EP | 0 838 613 A2 | 4/1998 |
| EP | 1 072 819 A3 | 1/2001 |
| EP | 1 134 110 A2 | 9/2001 |
| EP | 1 172 249 A2 | 1/2002 |
| EP | 1 174 645 A2 | 1/2002 |
| EP | 1 753 976 AO | 2/2007 |
| JP | 03-292449 | 12/1991 |
| JP | 10-181388 | 7/1998 |
| JP | 2000-198375 | 7/2000 |
| JP | 2002-005276 | 1/2002 |
| SU | 1426867 A1 | 9/1988 |
| SU | 1502413 A1 | 8/1989 |
| WO | WO 90/05860 | 5/1990 |
| WO | WO 93/21031 | 10/1993 |
| WO | WO 02/099317 A1 | 12/2002 |
| WO | WO 2004/085190 A1 | 10/2004 |

OTHER PUBLICATIONS

PCT/EP2006/050536, International Search Report, Date of Mailing Jun. 12, 2006, 3 pages.

PCT/EP2006/050536, Written Opinion of the International Searching Authority, Dated Jul. 31, 2007, 6 pages.

\* cited by examiner

POWERTRAIN CONTROL METHOD AND SYSTEM

CROSS-REFERENCE TO OTHER APPLICATIONS

This is a National Phase of International Application No. PCT/EP2006/050536, filed on Jan. 30, 2006, which claims priority from Great Britain Patent Application No. 0501763.7, filed on Jan. 28, 2005.

BACKGROUND OF THE INVENTION

The present invention is concerned with control of motor vehicle powertrains, specifically those having a continuously variable transmission with the ability to provide an infinite speed reduction from input to output ("geared neutral").

Continuously variable transmissions typically comprise a variator—that is, a device for providing a steplessly variable drive ratio—coupled between a transmission input and output through additional gearing. Some such transmissions are able to achieve a state referred to as "geared neutral" in which they provide an infinite speed reduction from input to output, so that even though the transmission input rotates and is coupled to the output through the transmission, the transmission output is stationary. One known type of geared neutral transmission uses an epicyclic shunt gear having three rotary shafts coupled respectively to sun, ring and planet carrier components of the epicyclic. One shaft is also coupled to the transmission input through the variator and so drivable therefrom at continuously variable ratio. Another of the shafts is coupled to the transmission input through a fixed ratio gear train. The third shaft is coupled through a further gear train to the transmission output and its rotational speed is a function of the speeds of the other two shafts, as those familiar with epicyclic gears will immediately appreciate. At a particular variator drive ratio, the motions of the first and second shafts cancel each other out, leaving the third shaft, and the transmission output, stationary.

By convention, transmission ratio is expressed as the transmission's input speed divided by its output speed. Expressed in this way the ratio behaves asymptotically, tending to infinity at geared neutral. Consequently it will be convenient in what follows to refer instead to the "reciprocal transmission ratio"—i.e. transmission output speed divided by input speed—whose behaviour around geared neutral is non-asymptotic (it simply falls to zero) and so easier to describe.

Of course most commercial motor vehicle transmissions rely upon some form of "launch device", such as the driver-operated clutch of a conventional manual transmission, or the torque converter of a conventional stepped-ratio automatic, to de-couple the engine and vehicle wheels when the vehicle is stationary, and to allow slip between engine and wheels as the vehicle moves away. In a geared neutral transmission it is possible (although not obligatory) to dispense with the launch device. The transmission is able to move from reverse gear through geared neutral to forward gear simply due to changes in the variator drive ratio, without the need to de-couple engine and wheels. At the very low reciprocal transmission ratios made possible by a geared neutral transmission, problems arise in controlling the powertrain which are simply never encountered with more conventional transmissions.

In an ideal system with no frictional loss, compliance, etc., a zero reciprocal transmission ratio would imply an infinite torque multiplication from the transmission's input to its output. That is, any torque at the input would produce an infinite torque at the output. Of course, no practical transmission can provide infinite output torque. A more practical way to characterise the situation is to say that in this condition, in the steady state (i.e. when the engine/transmission input is not accelerating) the torque at the transmission input is zero whatever the torque at its output. A condition in which torque at the transmission output creates zero torque at its input will be referred to herein as a "singularity". It has implications for the manner in which the engine and transmission should be controlled around geared neutral.

Certain consequent problems, and one method for addressing them, were discussed in Torotrak (Development) Limited's prior U.S. Pat. No. 5,521,819 and its European counterpart 643648. The present invention results, however, from a recognition not found in this earlier patent—that in a practical transmission, because of frictional losses, there are not one but two singularities, neither of which occurs precisely at geared neutral. Instead the two singularities occur at respective reciprocal transmission ratios close to geared neutral but lying to either side of it—i.e. at low forward and reverse reciprocal transmission ratios. The singularities are encountered only in "overrun" conditions—that is, where the torque exerted by the transmission at its output tends to decelerate the transmission output. In this condition power is input to the transmission through the output, and it is when this power is equal to the power dissipated by transmission inefficiency that the singularity occurs.

This understanding has important implications for the manner in which the engine and transmission are controlled. Existing control systems which operate flawlessly in most conditions have been found to malfunction severely under certain circumstances, such as when "shuttling" and hill climbing/descending. It is now recognised that it is in these situations that the singularities are encountered and must be allowed for.

On the other hand the advantages to be gained from proper powertrain management at ratios around the singularities, in accordance with the present invention, have been found to be startling. In particular it becomes possible to use the transmission to exercise such accurate low speed control of the vehicle as to make possible a whole range of control options for the driver.

One particular problem concerns control of engine speed in overrun. It is useful in this context to draw a distinction between (1) a situation where the engine is "loaded" by the transmission—that is, torque at the transmission input tends to slow the engine, and (2) the opposite condition where the engine is "unloaded", the torque at the transmission input tending to drive the engine. Unloading of the engine occurs in overrun at ratios away from geared neutral. Power flows from the wheels to the engine and is dissipated frictionally in it, providing "engine braking". In this condition, in an electronically controlled powertrain, it is conventional to de-fuel the engine, applying a zero torque demand to it. However, overrun does not always cause the engine to be unloaded. At reciprocal transmission ratios between the singularities, the engine is always loaded despite any overrun torque at the transmission output/vehicle wheels. Failure to take account of this leads to loss of control of engine speed in the exceptional conditions where the singularities are experienced.

SUMMARY OF THE INVENTION

In accordance with a first aspect of the present invention, there is a method of operating a motor vehicle powertrain comprising an infinitely variable transmission and an engine, the transmission comprising a rotary transmission input coupled to the engine, a rotary transmission output coupled to the vehicle wheels, a variator which provides a continuously variable ratio (the "variator ratio"), and gearing for coupling the variator between the engine and the transmission output in such a manner that the ratio of transmission output speed to transmission input speed (the "reciprocal transmission ratio") is a function of the variator ratio, that the available range of variator ratios maps onto both forward and reverse reciprocal transmission ratios, and that at a particular variator ratio (the "geared neutral ratio") the transmission output is stationary despite its being coupled through the transmission to the rotating transmission input, the method being characterised in that it comprises sustaining engine speed in a range of low reciprocal transmission ratios containing and extending to either side of geared neutral, by applying a drive torque demand to the engine even while the powertrain is operating in overrun.

In particular, the said drive torque is more than sufficient to overcome internal engine losses. Hence power flows from the engine to the transmission, despite the powertrain being overrun.

It is particularly preferred that the aforementioned range of ratios extends at least from one singularity ratio to the other.

It has been established that, between the singularities, the loading applied by the transmission to the engine increases as the overrun torque at the transmission output increases.

In a particularly preferred embodiment the method comprises increasing the engine torque demand in response to increased overrun torque at the transmission output.

The method is applicable in particular to transmissions using a variator of "torque controlled" type. Such variators are known in the art and an example will be described below. A conventional variator receives a control signal indicating a required ratio, and is constructed and controlled to adjust itself to that ratio. By contrast, a torque controlled variator instead receives a signal indicating a required reaction torque, defined as the sum of the torques at the input and output of the variator. Reaction torque is thus the net torque tending to rotate the whole variator bodily, which has to be reacted back to the variator's mountings. Ratio is not directly regulated. Instead the variator creates the required reaction torque and automatically accommodates ratio changes resulting from acceleration of the engine and/or vehicle.

There is an inevitable lag between a change in engine torque demand and a corresponding change in the engine torque delivered, particularly where the change is effected by altering the engine fuelling. In overrun, as the reciprocal transmission ratio, while rising or falling toward zero (geared neutral), passes through the singularity, the engine changes from being unloaded to being loaded. Unless engine torque is immediately available, despite the lag, engine speed will fall, with the risk of engine stall.

A particularly preferred embodiment of the present invention comprises, while operating in overrun and as the reciprocal transmission ratio rises or falls toward zero, increasing engine torque demand in anticipation of the reciprocal transmission ratio passing through either of the singularities.

The increase in torque demand preferably has the effect of providing driving engine torque when the transmission ratio is at the singularity, or prior to that time.

The engine in question would typically be an internal combustion engine and more specifically a non speed-governed engine as for example a typical petrol engine. Engines which govern their own speed, such as certain diesel engines, are not subject to all of the same problems. However the invention could conceivably be used with powertrains having engines of other types and the word "engine" should be understood to cover rotary power units of other types including electric motors.

In accordance with a second aspect of the present invention there is a control system for a motor vehicle powertrain comprising an infinitely variable transmission and an engine, the transmission comprising a rotary transmission input coupled to the engine, a rotary transmission output coupled to the vehicle wheels, a variator which provides a continuously variable ratio (the "variator ratio"), and gearing for coupling the variator between the transmission input and output in such a manner that the ratio of transmission output speed to transmission input speed (the "reciprocal transmission ratio") is a function of the variator ratio, that the available range of variator ratios maps onto both forward and reverse reciprocal transmission ratios, and that at a particular variator ratio (the "geared neutral ratio") the transmission output is stationary despite its being coupled through the transmission to the rotating transmission input, the variator being of the type which is constructed such as to provide a required reaction torque and to automatically accommodate changes in transmission/variator ratio, and the control system having two strategies for determining the reaction torque required of the variator—a default strategy and a singularity-handling strategy—and being arranged to hand over control from the default strategy to the singularity-handling strategy when the transmission ratio approaches either singularity in an overrun condition.

BRIEF DESCRIPTION OF THE DRAWINGS

Specific embodiments of the present invention will now be described, by way of example only, with reference to the accompanying drawings in which:—

DETAILED DESCRIPTION OF THE INVENTION

Figure 1A:
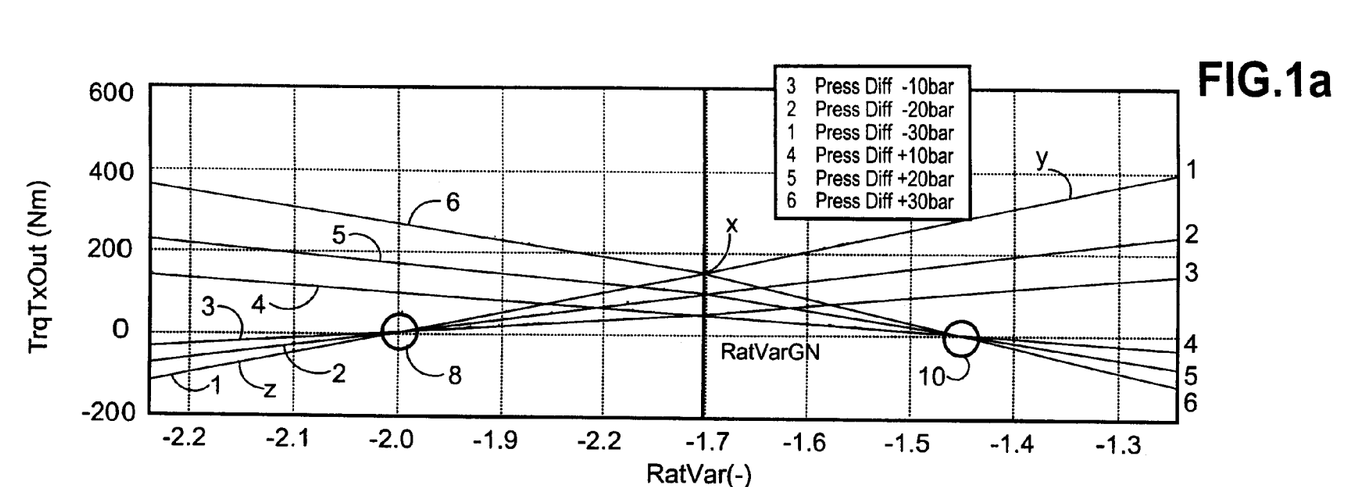
FIG. 1a is a graph of transmission input torque (engine loading torque) against variator ratio, for various values of reaction torque.
Figure 1B:
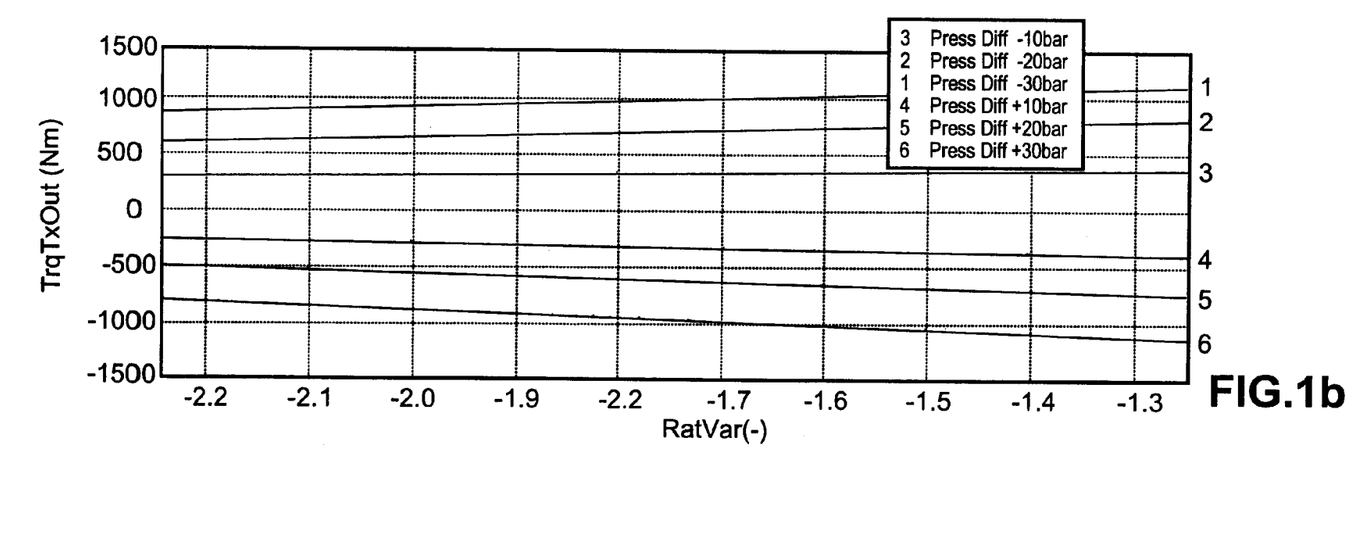
FIG. 1b is a graph of transmission output torque (wheel torque) for the same reaction torque values.

The present invention derives from the analysis of transmission behaviour, at ratios around geared neutral, which is represented graphically in FIGS. 1a and 1b. Both show variator ratio along the horizontal axis. This is a function of, but not the same as, the reciprocal transmission ratio. The graphs do not include the entire range of ratios available from the variator, but only a small range on either side of the geared neutral ratio, which in this example is −1.7. This is the variator ratio which results in infinite speed reduction from the transmission as a whole—i.e. zero transmission output speed. Points to the right hand side of this ratio correspond to forward vehicle motion and points to the left hand side to reverse. In FIG. 1a the vertical axis represents torque exerted by the transmission at its input—i.e. the loading (or unloading, in the case of negative values) torque applied to the engine by the transmission. In FIG. 1b the vertical axis represents torque at the transmission output—i.e. the torque passed on to the driven wheels of the motor vehicle. Positive values correspond to forward wheel torque, and negative values to reverse. Both graphs show six different numbered lines 1-6, each corresponding to a different reaction torque setting of the variator. In a hydraulically controlled variator of the known type to be described below, these settings correspond to respective different pressure differences applied to the variator's actuators, and the relevant pressures are shown in a key upon the Figures. Lines 1, 2 and 3 represent forward wheel torque (i.e. a situation in which the wheels urge the vehicle forward) while lines 4, 5 and 6 represent reverse wheel torque. For comparison, FIGS. 2a and 2b correspond to FIGS. 1a and 1b but show an idealized situation in which the transmission is taken to be 100 percent efficient.

Figure 2A:
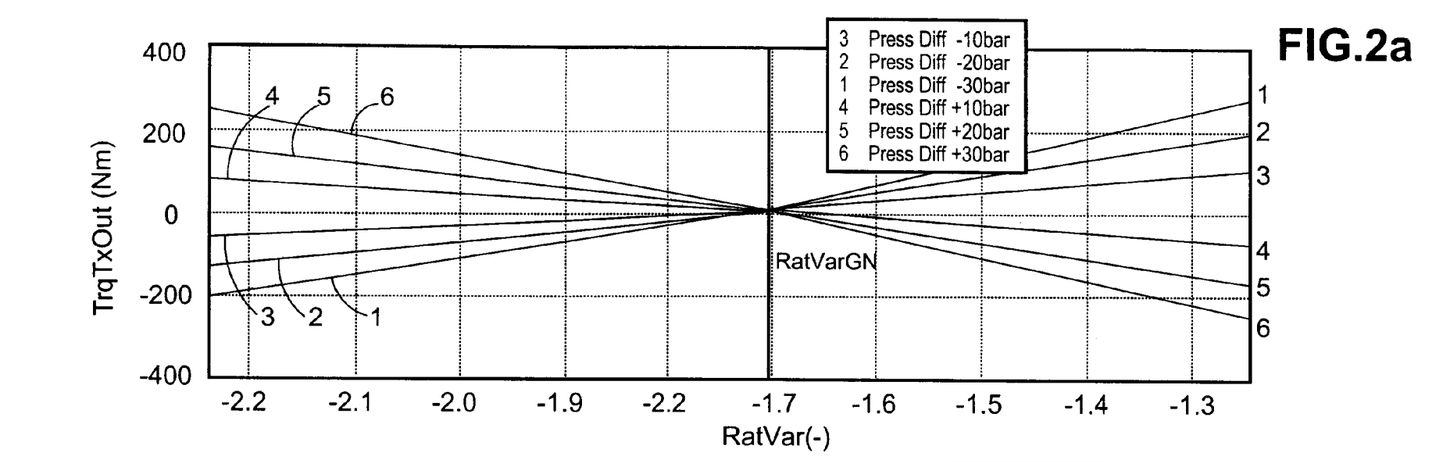
FIGS. 2a and 2b correspond to FIG. 1a and 1b except that they show torques expected of a notional infinitely energy efficient transmission.
Figure 2B:
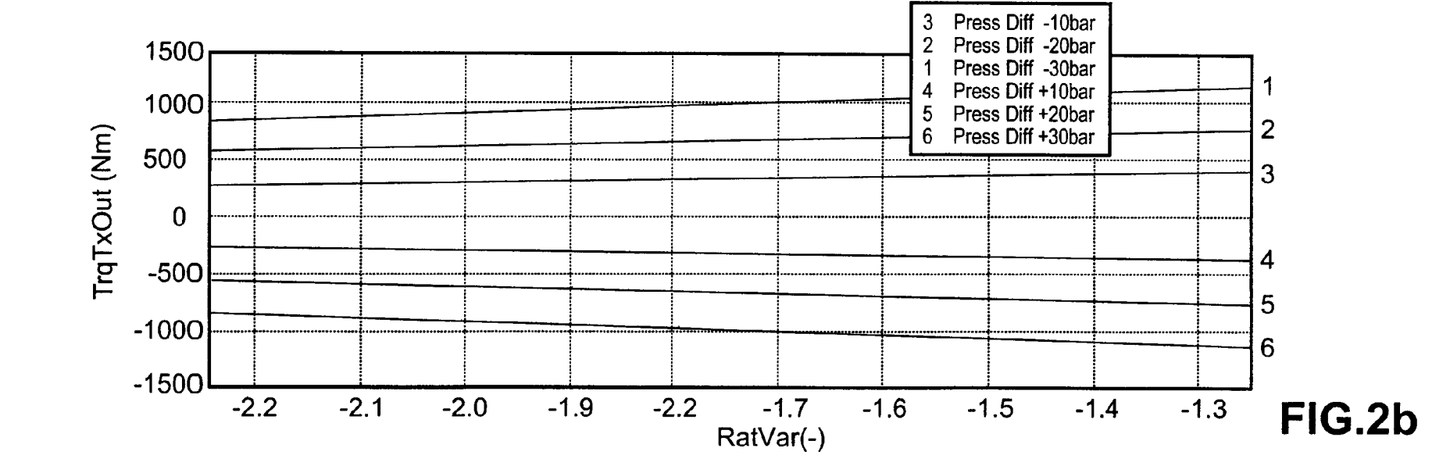

In FIG. 2a it can be seen that for a perfectly efficient transmission engine, loading falls to zero at the geared neutral singularity, regardless of the reaction torque created by the variator. Compare this, however, with the behaviour of a real transmission represented in FIG. 1, which has two separate singularities on either side of geared neutral:— the "reverse overrun singularity" 8 is to the left of geared neutral—vehicle moving backward—and is experienced with forward wheel torque (lines 1, 2 and 3). For all forward wheel torques (above a certain minimum), the engine load (vertical axis, FIG. 1a) falls to zero at this singularity;

the "forward overrun singularity" 10 is to the right of geared neutral—vehicle moving forwards—and is experienced with reverse wheel torque. For all reverse wheel torques (again, above a certain minimum), the engine load falls to zero at this singularity.

The difference between FIGS. 1 and 2 is caused by the energy dissipated in a real transmission due to inefficiency—frictional losses etc. The condition for the input (loading) torque to fall to zero is that these frictional losses must be balanced by energy received by the transmission through its output. Hence the singularities can only be experienced in an overrun condition—i.e. when the direction of the wheel torque applied by the transmission is opposite to the direction of rotation of the wheels.

Consider for example line 1, which represents a forward wheel torque condition (FIG. 1b). Suppose that the vehicle is initially in the state represented by point X. It is moving forward (variator ratio is to the right of geared neutral); wheel torque is forward (see FIG. 1b) and the engine is being loaded, and so must be fuelled in order to sustain its speed. Suppose further that despite the forward wheel torque the vehicle is decelerating, e.g. because it is climbing a steep hill. If engine speed is sustained then, as the vehicle slows, ratio must fall, so that the operating point moves to the left in the graphs. At point Y the vehicle reaches a standstill and it subsequently begins to roll back down the hill, the transmission thus moving into reverse. The idealized analysis represented by FIG. 2a would suggest that as soon as the vehicle begins to roll backwards the engine begins to be progressively unloaded. However in practice (FIG. 1a) the transition from loading to unloading of the engine does not take place until the vehicle has begun to move backward and the ratio has consequently fallen further, to that of the reverse overrun singularity 8. At point Z, to the left of the singularity, the engine is being progressively unloaded.

The reverse overrun singularity 8 can also be experienced in a situation where the vehicle is initially travelling backward point Z) but the driver demands forward wheel torque. This condition is experienced for example in what is referred to as "shuttling", where the driver first reverses the vehicle, and then moves the drive control to "forward" while the vehicle is in motion. In a geared neutral type of transmission the required forward wheel torque is provided, while moving backwards, by de-fuelling the engine and unloading it. The vehicle accelerates forwards (i.e. slows toward geared neutral), which can result in the singularity condition being reached. This happens before ratio reaches geared neutral.

The forward overrun singularity can similarly be approached from either direction, but again always in an overrun condition. Suppose for example that the vehicle is initially stationary or reversing and is facing down a hill, as a result of which it accelerates forwards despite reverse wheel torque. The relevant lines are nos. 4, 5 and 6 in FIG. 1, and the forward overrun singularity is in this scenario approached from the left. Shuttling into reverse while the vehicle is moving forwards would cause the powertrain to approach the same singularity from the right, in the graphs.

Figure 3:
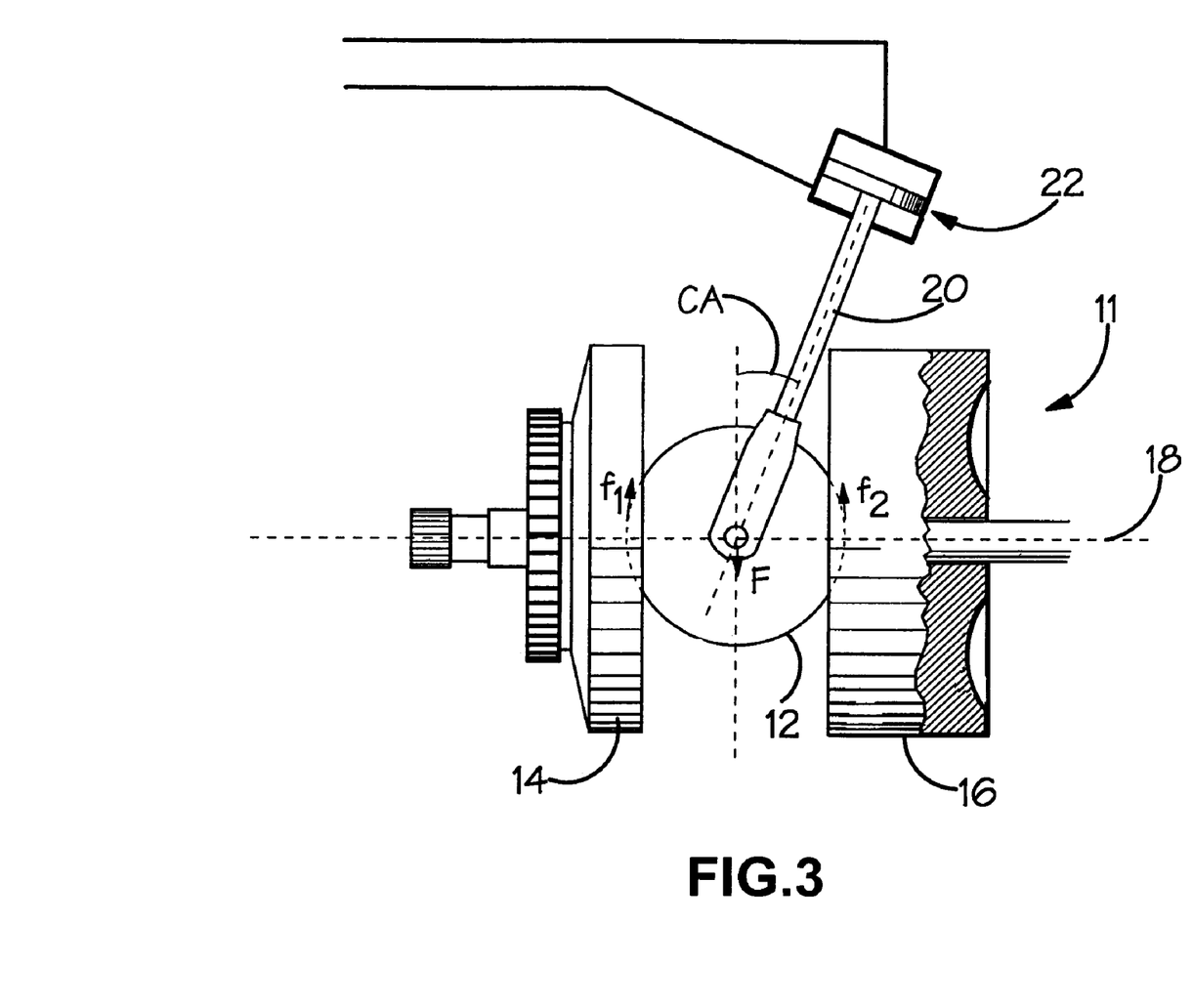
FIG. 3 is a highly simplified representation of a variator for use in implementing the present invention.
Figure 4:
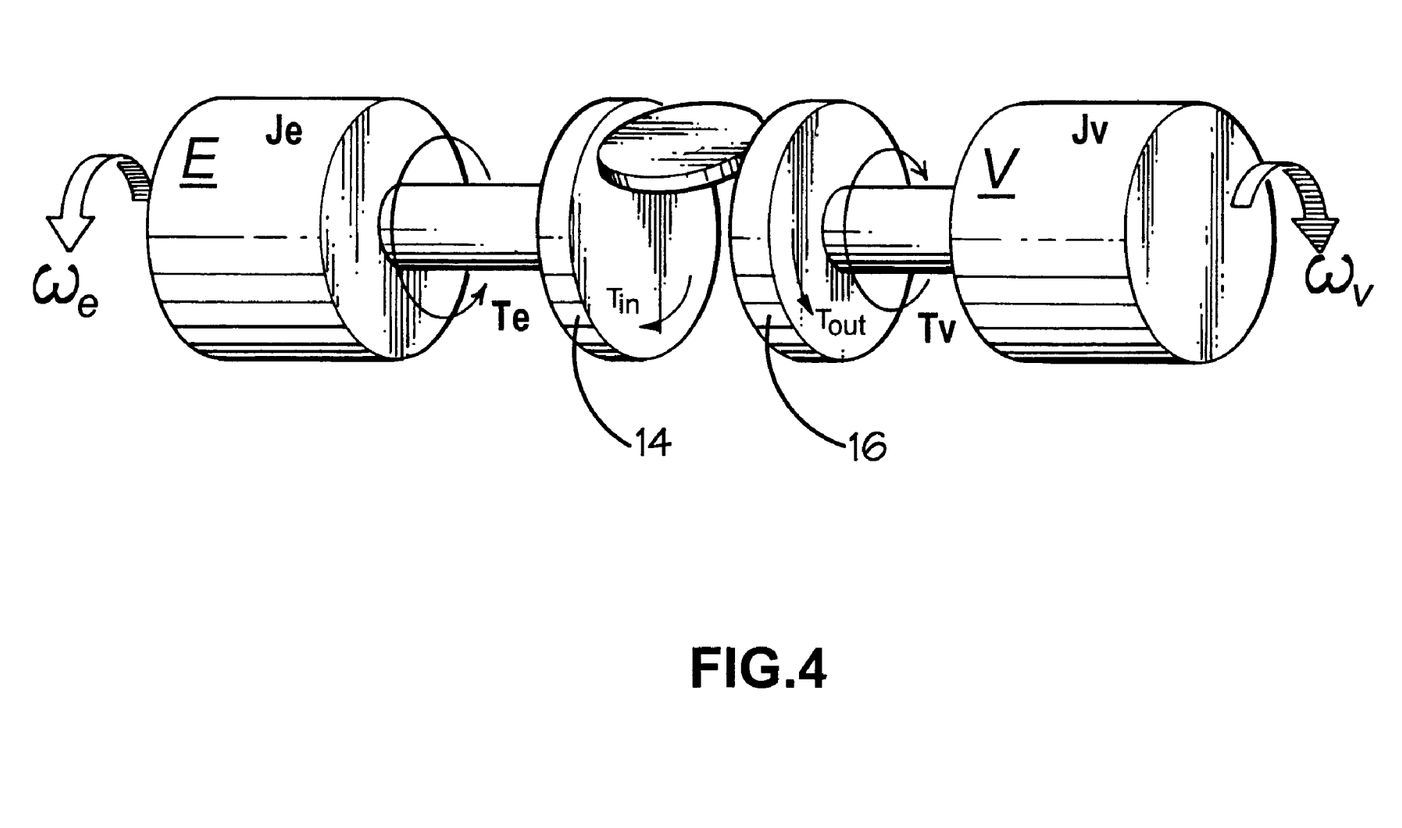
FIG. 4 is a highly schematic representation of a powertrain operable in accordance with the present invention.

In order to explain the implications of the singularities, it is necessary first of all to consider the particular challenges which are encountered in regulating a torque-controlled transmission, even at ratios well away from the singularities. To this end FIGS. 3 and 4 provide highly schematic representations respectively of a variator suitable for use in implementing the present invention and of a powertrain incorporating the variator. The subject matter shown in these drawings is not in itself novel. More detail on the construction and function of the variator and powertrain can be found in Torotrak (Development) Ltd.'s patent portfolio, and in this regard reference is directed in particular to European patent 0444086.

The variator 11 in these drawings is of toroidal-race, rolling-traction type, although the present invention is not limited to variators constructed in this manner. A roller 12 (which would in a practical variator be one of a set) runs upon, and serves to transfer drive between two races 14,16. The roller is able to change its angle to the common axis 18 of the races by precessing about precession axis 20. It is also subject to an adjustable, force, having a component F along the circumferential direction, through a hydraulic actuator 22, and is able to move back and forth along the circumferential direction. Ratio changes involve the roller moving backwards or forwards along this circumference, as a result of which the races 14,16 exert upon it a steering moment, causing it to precess, and so to change the relative radii of the paths the roller traces upon the races, enabling the ratio change. The force F is equal and opposite to the sum of forces $f_1+f_2$ exerted by the races upon the roller. Further, the sum $f_1+f_2$ is proportional to the sum of the torques $T_{in}$ and $T_{out}$ exerted by the roller 12 upon the respective races 14, 16. Hence the sum $T_{in}+T_{out}$, referred to herein as the reaction torque of the variator, is at all times proportional to the actuator force F. By controlling the actuator force, reaction torque is directly controlled.

According to this approach, it is not variator ratio which is selected and set through the variator, but reaction torque. In this respect the powertrain in question is quite different from the norm. Most transmissions are constructed such that they receive an input—be it hydraulic, electric or in some other form—indicative of required ratio, and that they adopt a ratio which is a function of the signal. This is not the case in the "torque-controlled" type of variator and transmission considered here. Instead the variator sets a required reaction torque and its ratio automatically changes to accommodate changes in engine and vehicle speed.

FIG. 4 is intended to clarify this aspect of the transmission's operation. A block E represents the total moment of inertia $J_e$ coupled to the variator input and so includes the moments of inertia of rotating engine components, of gearing coupling the engine to the variator, of the race 14, etc. This block is shown (in this highly stylized drawing) as being coupled directly to the race 14 of the variator 11. In reality of course there is intervening gearing, which in some embodiments includes an epicyclic shunt. A further block V represents the total moment of inertia $J_v$ coupled to the variator output and so includes moments of inertia of downstream driveline components—driveshaft, differential gearing, driven wheels etc. and also the inertia of the vehicle itself. On the engine side of the variator, the net torque available to accelerate the inertia $J_e$ is the sum of the engine torque $T_e$ and the load $T_{in}$ exerted on the race 14 by the variator roller. While these torques balance—i.e. are equal and opposite—engine speed is constant. An inequality causes a non-zero net torque to act on the inertia $J_e$, and consequent engine acceleration. The variator roller automatically moves and precesses to accommodate the consequent transmission ratio change. It will be apparent that in order to control engine speed, it is necessary, in a dynamic manner, to control the balance between engine torque and the load torque $T_{in}$ applied to the engine by the transmission.

On the vehicle/output side of the variator, the net torque available to accelerate inertia J, depends on the balance between (1) variator output torque $T_{out}$ and (2) externally applied torques—from the vehicle's brakes, the wheels (due to drag, road gradient), etc. Any resulting net torque is available to accelerate the vehicle. The variator automatically accommodates consequent transmission ratio changes.

Figure 9:
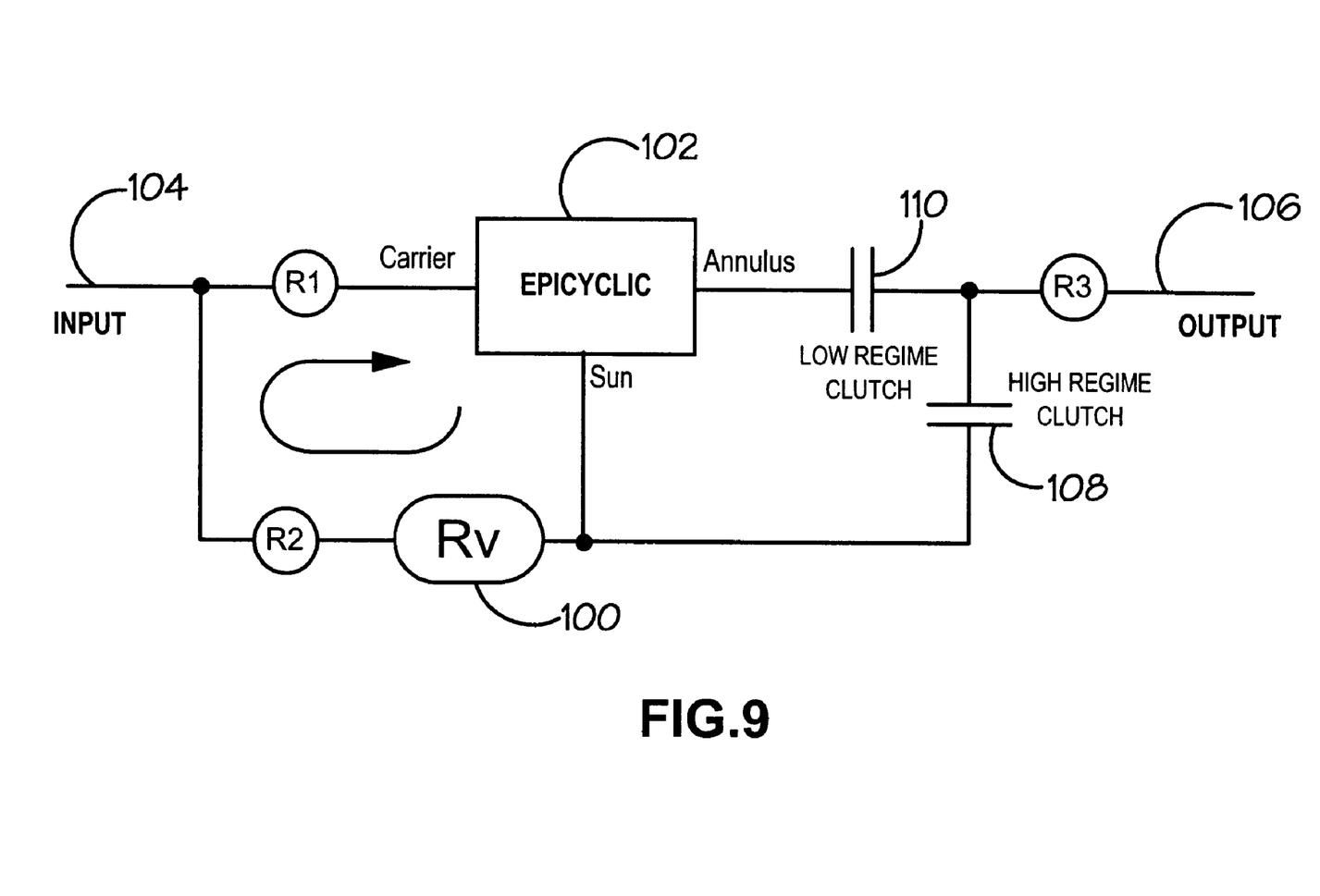
FIG. 9 is a schematic representation of a transmission operable in accordance with the present invention.

Again it must be emphasised that FIG. 4 is highly simplified and serves merely to illustrate certain principles. The main functional components of a real transmission are represented in FIG. 9, in which the variator is indicated at 100 and the epicyclic shunt at 102. The variator is connected on one side via gearing R2 to the transmission input 104, and so to the engine, and on its other side to the sun gear of the epicyclic shunt 102. The carrier of the epicyclic shunt is also connected to the transmission input shaft 104 via gearing R1. Consequently a power recirculatory loop containing the variator and shunt is formed, as is familiar to those skilled in the art and indicated in the drawing by a curved arrow. Coupling to the transmission output shaft 106 can be by either of two routes. Closing high regime clutch 108 and opening low regime clutch 110 creates a drive path from the transmission input through gearing R2, the variator 100 and gearing R3 to the transmission output. The epicyclic shunt is effectively circumvented. High regime is used to provide higher forward reciprocal transmission ratios and not geared neutral. To provide lower ratios, the low regime clutch 110 is engaged and the other clutch is disengaged, so that drive to the transmission output 106 is taken from the annulus of the epicyclic shunt 102. Low regime provides geared neutral. It is only in low regime that the issues considered herein arise.

A control system, usually electronically implemented, is required which manages the torque demanded of the engine and the reaction torque demanded of the variator in a coordinated manner, in order to (1) control the dynamic balance at the engine/transmission interface to vary engine speed and torque as necessary whilst at the same time (2) providing torque at the powertrain output—the driven vehicle wheels—which adequately reflects the driver's requirement. This is done by controlling two variables—engine torque demand and variator reaction torque demand. Particular issues relating to engine control will be considered first, before going on to describe a suitable control system.

In overrun, at reciprocal transmission ratios away from the singularities, power flows from the wheels via the transmission to the engine, wherein it is frictionally dissipated. Engine speed is sustained by the action of the transmission. The engine can thus be de-fuelled (zero applied torque demand). Point Z on FIG. 1a represents such a condition. However as the ratio approaches the singularity value 8 the torque at the transmission input falls toward zero. A point is reached where engine speed cannot be sustained by the transmission alone and the consequence, in earlier prototypes, has been that engine speed falls correspondingly with resultant misbehavior of the powertrain. Furthermore, at ratios between the singularities, power always flows from the engine to the transmission, even in overrun. Hence engine speed cannot be maintained by torque from the transmission/wheels. Instead the engine must be fuelled (by virtue of a positive torque demand) if it is to sustain its speed. Hence in the system to be described below, while engine speed is to be sustained, the torque demand to the engine is always positive for ratios between the two singularities.

Note that there may nonetheless be conditions where, the engine speed on entry to the relevant ratio range having been excessive, it is necessary to reduce engine speed. In this circumstance the engine may be de-fuelled even at ratios between the singularities.

In a torque controlled transmission engine speed will be constant if the engine torque is equal to the load applied to the engine by the transmission. FIG. 1a is a graph of the latter quantity. Consider the variator ratio range from the reverse overrun singularity 8 to geared neutral. Forward wheel torque (lines 1, 2 and 3) creates an overrun condition. The graph demonstrates that the engine load actually increases with increasing overrun torque. This is the opposite of the usual situation, at ratios away from the singularities, where increasing overrun torque would increase unloading of the engine. The explanation is that increased overrun torque creates increased power recirculation in the transmission (refer again to FIG. 10, showing the loop in which power is recirculated) and as a result power loss due to variator inefficiency is also increased, outweighing the increase in input power from the wheels.

The present system thus increases engine torque demand in response to an increase in overrun torque, while the ratio is between the two singularities.

Furthermore the time lag between a change in engine fuelling and a corresponding change in engine output torque needs to be allowed for. If engine fuelling were commenced upon passing through the singularity, then due to the lag, loading of the engine would commence before engine torque was available to sustain engine speed. The solution is to increase fuelling of the engine as the singularity is approached and before the loading of the engine commences. The system anticipates ratio reaching and passing through the singularity and prepares the engine, by pre-fuelling it, to create the torque needed to sustain its own rotation.

Turning now to the other control variable, reaction torque, there are in principle two different ways to calculate the reaction torque which is to be demanded of the variator, to be referred to as strategies A and B:

A. Reaction torque demand can be calculated from a required torque at the variator input, taking account of current variator ratio; or B. Reaction torque demand can be calculated from a required torque at the variator output, again taking account of current variator ratio.

Strategy A is more generally appropriate, since it facilitates management of the aforementioned dynamic engine/transmission torque balance. The detailed implementation of such a strategy will not be described herein. The reader is referred to Torotrak's International Patent Application PCT/GB04103293 for such details. Summarizing, however, one such implementation involves:—

1. Selecting, based on driver input (typically through the accelerator control) target values of engine speed and engine torque;
2. Setting a torque demand applied to the engine to the sum of (i) the target engine torque and (ii) a torque adjustment needed to accelerate the engine-side inertia $J_e$ toward the target engine speed;
3. Estimating the engine's instantaneous expected output torque in response to the torque demand (since actual engine torque lags behind the demand under dynamic conditions) and
4. Setting the variator reaction torque such that the torque exerted by the variator at its input is equal to the estimated engine output torque, less the torque adjustment.

A practical system also involves a closed loop correction to engine speed, based upon a prediction of engine acceleration. This prediction is obtained by subtracting loading applied to the engine (calculated from the variator reaction torque, using a model of the transmission) from the expected instantaneous output torque. This gives the net torque acting on the engine-side inertia ($J_e$, FIG. 4) so that engine acceleration can then be found by Newtonian principles.

Strategy A breaks down, however, as the transmission approaches the singularities. At a singularity, the variator exerts zero torque at its input, regardless of the reaction torque setting. In this condition the calculation at step 4 involves a division by zero. At ratios close to the singularity, inaccuracies are magnified and calculating reaction torque in this way can result in creation of torque at the driven wheels which deviates unacceptably from the driver's expectation, and which is subject to unacceptable oscillation.

Recall that the singularities are only experienced in "overrun" conditions. In the vicinity of the singularities, because transmission ratio is low, the torque applied to the engine by the transmission is relatively small. Furthermore the singularities occur in situations—shuttling or hill climbing/descending—in which some engine "flare" is acceptable to the driver to provide the required over-run torque. These factors make strategy B appropriate. Reaction torque can be based directly on the driver's wheel torque request, as communicated through the accelerator and drive controls.

Figure 5:
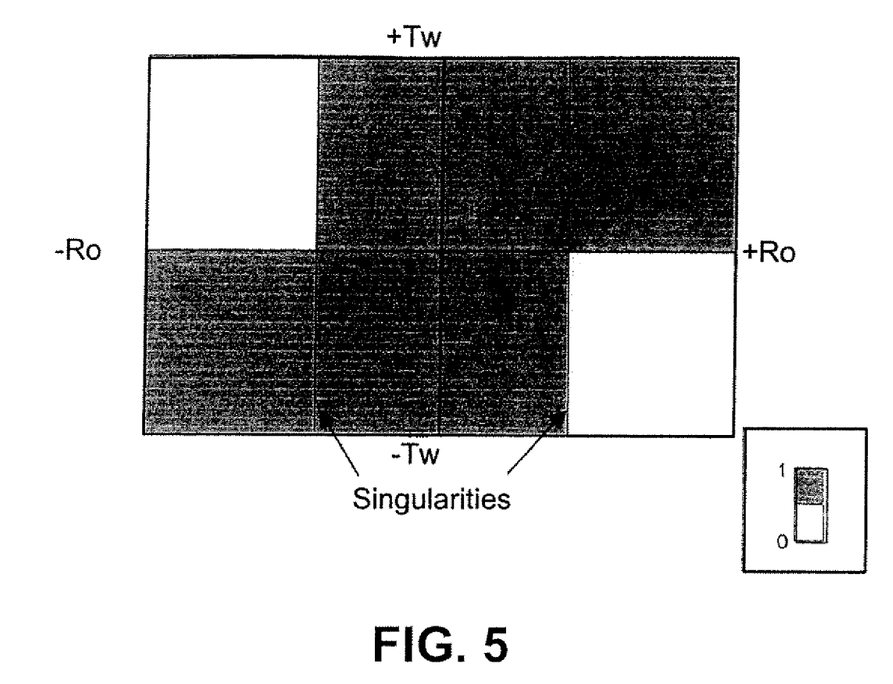
FIG. 5 is a graph of transmission ratio against wheel torque, showing in which regions the engine is loaded by the transmission.

Some method is then needed to select which of the two strategies is to be used at any given instant. Note from FIG. 1 that on either side of the singularity ratio the input is either loaded or unloaded, depending upon the direction of the transmission ratio. The control system uses this knowledge to determine by which strategy reaction torque demand should be obtained. If the engine is to be unloaded, no compensation is needed for its dynamic response and strategy B can be applied. FIG. 5 shows transmission ratio on the horizontal axis and transmission output torque (wheel torque) on the vertical axis. In the dark area, termed the normal driving area, the engine is loaded. In the light areas, the engine is unloaded.

Figure 6:
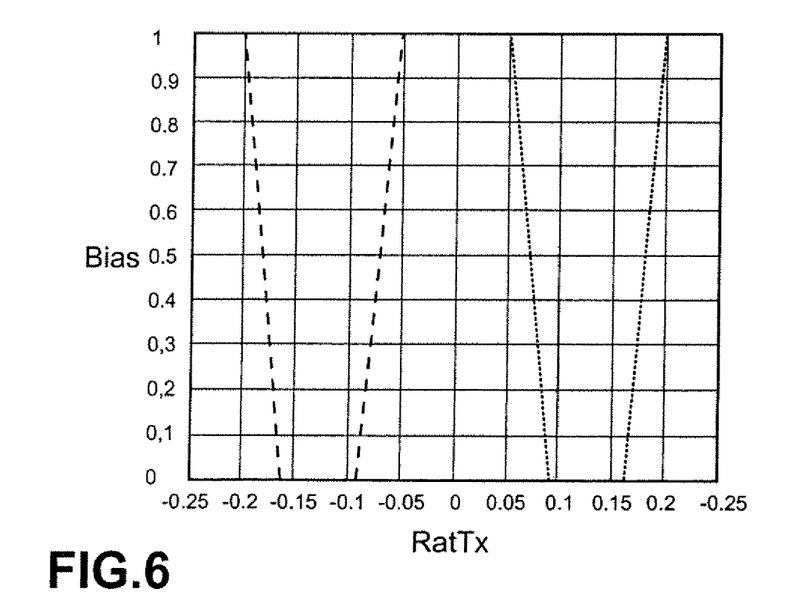
FIG. 6 is a graph of a bias value used by a control system embodying the present invention.

The control system employs a bias function whose value varies between zero (to select strategy B) and 1 (to select strategy A), as shown in the key. The bias function must take account of both transmission ratio and the sign of the driver's wheel torque request. FIG. 6 shows the variation of the bias value (vertical axis) with ratio (horizontal axis) and contains two lines 60 and 62, the former applicable when the requested wheel torque is positive and the latter when it is negative. The control system performs a test on the sign of the wheel torque request to determine which is relevant. The form of the bias function provides for a progressive handover of control strategy as the singularity approaches. Note that the handover to strategy B takes place before the ratio reaches the singularity.

A handover of control strategy can also be caused by a change in the driver's wheel torque request—i.e. by movement of the operating point along the y axis in FIG. 6. Away from the singularity ratios, in overrun, different requirements exist depending upon the driver's input. For example when the driver "backs out" (raises his/her foot from the accelerator pedal) the requirement is for a certain (small) level of reverse (overrun) wheel torque whilst engine speed control is maintained. However, if the driver "shuttles" by changing the driver control from "drive" to "reverse" whilst in motion, then this indicates an expectation of greater overrun wheel torque and engine speed control can be compromised—allowing the engine speed to "flare"—to achieve this. Hence during back-out the bias is to be 1, or close to it, while during shuttling the bias should be zero, or a low value.

Figure 7:
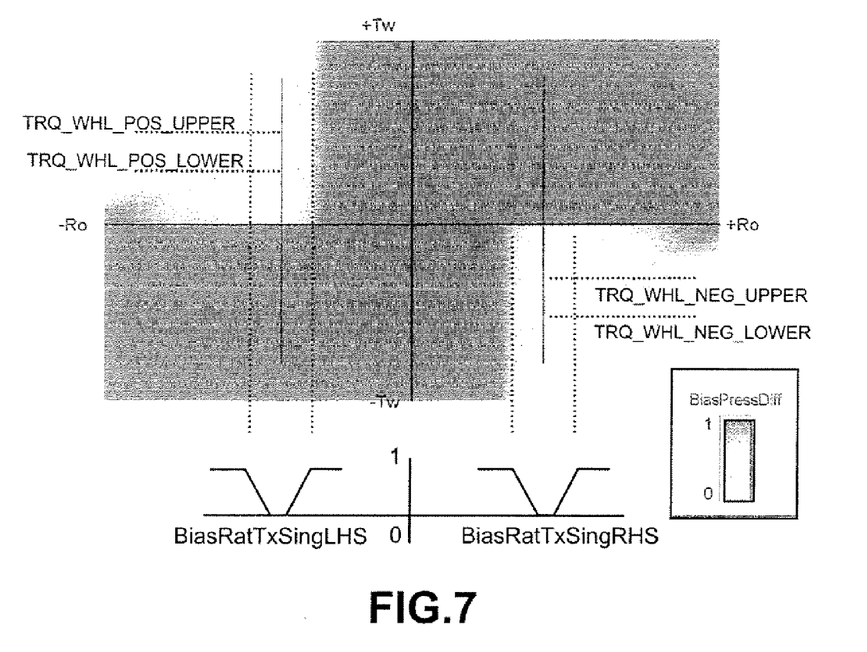
FIG. 7 is a further graphical representation of the bias function.
Figure 8:
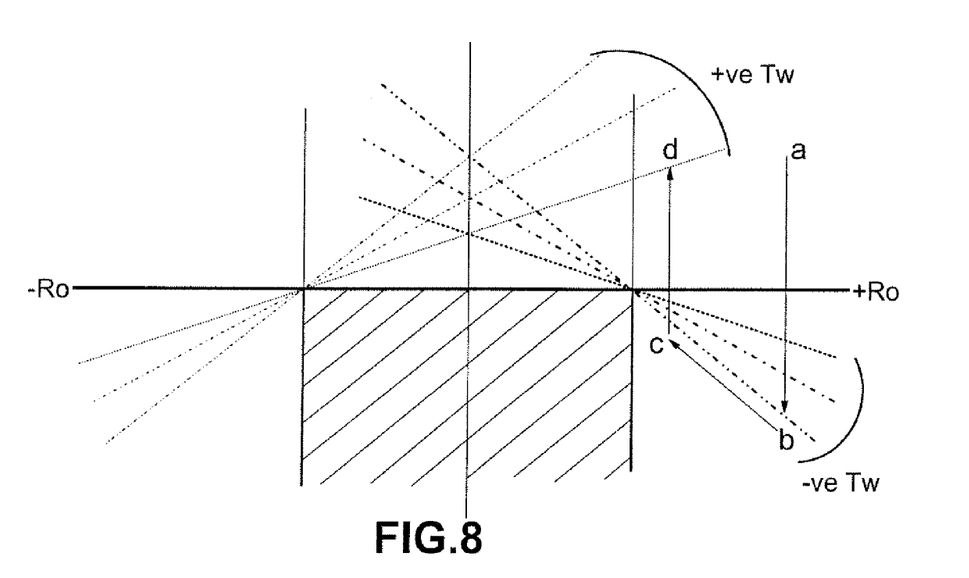
FIG. 8 is a graphical representation of a transient event.

To take account of these requirements the control system selects upper and lower boundaries of wheel torque, above and below the wheel torque demanded by the driver, and uses these to impose limits on reaction torque, thereby ensuring that wheel torque does not depart from the boundaries. FIG. 7 represents a version of the bias function modified to take account of the above. The wheel torque boundaries are labelled "upper" and "lower", although of course these vary with driver demand.

The actual determination of the wheel torque demanded by the driver is made on the basis of the position of the driver's accelerator control (pedal), typically also taking account of current vehicle speed.

The present invention has been found in practice to make possible dramatic improvement in control of vehicle speed around geared neutral (i.e. at low vehicle speeds). As a consequence the driver can be offered new functions. For example the driver can be offered the facility to set a chosen (low) vehicle speed, such as 1 mph, which will then be maintained by control of the driveline despite varying terrain. The chosen speed could be zero, in which case the driveline serves to keep the vehicle stationary. Such facilities are particularly useful to "all terrain" four wheel drive vehicles.

What is claimed is:

1. A method of operating a motor vehicle powertrain comprising an infinitely variable transmission and an engine, the transmission comprising a rotary transmission input coupled to the engine, a rotary transmission output coupled to the vehicle wheels, a variator which provides a continuously variable ratio (the "variator ratio"), and gearing for coupling the variator between the transmission input and output in such a manner that the ratio of transmission output speed to transmission input speed (the "reciprocal transmission ratio") is a function of the variator ratio, that the available range of variator ratios maps onto both forward and reverse reciprocal transmission ratios, and that at a particular variator ratio (the "geared neutral ratio") the transmission output is stationary despite its being coupled through the transmission to the rotating transmission input, the method being characterised in that it comprises sustaining engine speed where engine speed is not sustainable by torque from the transmission alone, in a low range of reciprocal transmission ratios containing and extending to either side of geared neutral, by applying a drive torque demand to the engine even while the powertrain is operating in overrun.

2. A method as claimed in claim 1 wherein said drive torque is more than sufficient to overcome internal engine losses.

3. A method as claimed in claim 1 wherein said range of reciprocal transmission ratios extends at least from a reverse ratio at which operating in overrun results in zero load being applied to the engine (the "reverse overrun singularity") to a forward ratio at which operating in overrun results in zero load being applied to the engine (the "forward overrun singularity").

4. A method as claimed in claim 3 which further comprises, while operating in overrun and as the reciprocal transmission ratio rises or falls toward zero, increasing engine torque demand in anticipation of the reciprocal transmission ratio passing through either singularity ratio.

5. A method as claimed in claim 1 wherein the method further comprises increasing engine torque demand, while operating in overrun in said ratio range, in response to an increase in overrun torque at the transmission output.

6. A method as claimed in claim 1 wherein the variator is torque controlled.

7. A motor vehicle powertrain comprising an infinitely variable transmission and an engine, the transmission comprising a rotary transmission input coupled to the engine, a rotary transmission output coupled to the vehicle wheels, a variator which provides a continuously variable ratio (the "variator ratio"), and gearing for coupling the variator between the transmission input and output in such a manner that the ratio of transmission output speed to transmission input speed (the "reciprocal transmission ratio") is a function of the variator ratio, that the available range of variator ratios maps onto both forward and reverse reciprocal transmission ratios, and that at a particular variator ratio (the "geared neutral ratio") the transmission output is stationary despite its being coupled through the transmission to the rotating transmission input, the powertrain having a control system which is adapted to sustain engine speed where engine speed is not sustainable by torque from the transmission alone, in a low range of reciprocal transmission ratios containing and extending to either side of geared neutral, by applying a drive torque demand to the engine even while the powertrain is operating in overrun.

8. A motor vehicle powertrain as claimed in claim 7, wherein said drive torque is more than sufficient to overcome internal engine losses.

9. A motor vehicle powertrain as claimed in claim 7 wherein said range of reciprocal transmission ratios extends at least from a reverse ratio at which operating in overrun results in zero load being applied to the engine (the "reverse overrun singularity") to a forward ratio at which operating in overrun results in zero load being applied to the engine (the "forward overrun singularity").

10. A motor vehicle powertrain as claimed in claim 9 wherein the control system is further adapted, while the powertrain is operating in overrun and as the reciprocal transmission ratio rises or falls toward zero, to increase engine torque demand in anticipation of the reciprocal transmission ratio passing through either singularity ratio.

11. A motor vehicle powertrain as claimed in claim 7 wherein the control system is further adapted to increase engine torque demand, while the powertrain is operating in overrun in said ratio range, in response to an increase in overrun torque at the transmission output.

12. A motor vehicle powertrain as claimed in claim 7 wherein the variator is torque controlled.

13. A control system for a motor vehicle powertrain comprising an infinitely variable transmission and an engine, the transmission comprising a rotary transmission input coupled to the engine, a rotary transmission output coupled to the vehicle wheels, a variator which provides a continuously variable ratio (the "variator ratio"), and gearing for coupling the variator between the transmission input and output in such a manner that the ratio of transmission output speed to transmission input speed (the "reciprocal transmission ratio") is a function of the variator ratio, that the available range of variator ratios maps onto both forward and reverse reciprocal transmission ratios, and that at a particular variator ratio (the "geared neutral ratio") the transmission output is stationary despite its being coupled through the transmission to the rotating transmission input, the variator being of the type which is constructed such as to provide a required reaction torque and to automatically accommodate changes in transmission/variator ratio, and the control system having two strategies for determining the reaction torque required of the variator—a default strategy and a singularity-handling strategy—and being arranged to hand over control from the default strategy to the singularity-handling strategy when the transmission ratio approaches either a reverse ratio at which operating in overrun results in zero load being applied to the engine (a "reverse overrun singularity") or a forward ratio at which operating in overrun results in zero load being applied to the engine (a "forward overrun singularity") in an overrun condition.

14. A control system as claimed in claim 13 wherein the default strategy involves determining the reaction torque required of the variator from a required engine load.

15. A control system as claimed in claim 13 wherein the singularity-handling strategy involves determining the reaction torque required of the variator from a required transmission output torque.

16. A control system as claimed in claim 13 wherein handover from the default strategy to the singularity-handling strategy takes place as the ratio falls toward the reverse overrun singularity, when transmission output torque is forward.

17. A control system as claimed in claim 13 wherein handover from the default strategy to the singularity-handling strategy takes place as the ratio rises toward the forward overrun singularity, when transmission output torque is reverse.

18. A control system as claimed in claim 13 wherein handover between the default and singularity-handling strategies takes place between geared neutral and either the reverse overrun singularity or the forward overrun singularity.

19. A control system as claimed in claim 13 wherein handover between the strategies takes place progressively over a range of transmission ratios.

20. A control system as claimed in claim 13 wherein the control system has a biasing function based upon transmission ratio and transmission output torque which determines which of the two strategies is adopted.

21. A control system as claimed in claim 13 wherein the default strategy is adopted at least when the powertrain is not in overrun.

22. A control system as claimed in claim 13 wherein the singularity-handling strategy is adopted at least when the transmission ratio is within a band taking in either the reverse overrun singularity or the forward overrun singularity.

* * * * *